United States Patent
Johnson et al.

(10) Patent No.: US 10,744,686 B2
(45) Date of Patent: Aug. 18, 2020

(54) SYSTEM FOR CREATING A STRUCTURE INCLUDING A VASCULATURE NETWORK

(71) Applicant: Palo Alto Research Center Incorporated, Palo Alto, CA (US)

(72) Inventors: David Mathew Johnson, San Francisco, CA (US); Corie Lynn Cobb, Mountain View, CA (US); John Steven Paschkewitz, San Carlos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 309 days.

(21) Appl. No.: 15/716,643

(22) Filed: Sep. 27, 2017

(65) Prior Publication Data

US 2018/0015644 A1    Jan. 18, 2018

Related U.S. Application Data

(62) Division of application No. 14/310,071, filed on Jun. 20, 2014, now Pat. No. 9,884,437.

(51) Int. Cl.
B29C 39/14 (2006.01)
B05C 1/14 (2006.01)
(Continued)

(52) U.S. Cl.
CPC ............ *B29C 39/22* (2013.01); *B05C 1/14* (2013.01); *B05C 5/0245* (2013.01); *B29C 39/003* (2013.01); *B29C 39/146* (2013.01); *B29C 39/148* (2013.01); *B29C 39/36* (2013.01); *B29C 41/006* (2013.01); *B29C 41/28* (2013.01); *B29C 41/36* (2013.01); *B29C 59/04* (2013.01); *B29K 2063/00* (2013.01); *B29K 2101/00* (2013.01); *B29K 2105/0058* (2013.01);
(Continued)

(58) Field of Classification Search
None
See application file for complete search history.

(56) References Cited

U.S. PATENT DOCUMENTS 3,135,676 A    6/1964   Neill
3,729,648 A    4/1973   Kerr
(Continued)

OTHER PUBLICATIONS

Williams et al, "Self-Healing Composite Sandwich Structures", Smart Mater. Struct. 16 (2007) 1198-1207.
(Continued)

*Primary Examiner* — Binu Thomas
(74) *Attorney, Agent, or Firm* — Fay Sharpe LLP

(57) ABSTRACT

A system and method is provided for creating a structure including a vasculature network. A film deposition device is configured to dispense droplets onto a surface of a substrate to form a curable fugitive pre-patterned liquid film on the surface of the substrate. An electrohydrodynamic film patterning (EHD-FP) device has a patterned electrode structure formed to generate an electric field and to subject the film on the surface of the substrate to the electric field. The film thereby being formed by the EHD-FP into patterned features in response to being subjected to the electric field. Then a casting system is configured to cover the patterned features in an epoxy to form patterned structures, wherein the patterned structures comprise a fugitive vasculature structure.

23 Claims, 12 Drawing Sheets

(51) Int. Cl.
*B05C 5/02* (2006.01)
*B29C 59/04* (2006.01)
*B29C 39/22* (2006.01)
*B29C 39/00* (2006.01)
*B29C 39/36* (2006.01)
*B29C 41/00* (2006.01)
*B29C 41/28* (2006.01)
*B29C 41/36* (2006.01)
B29K 63/00 (2006.01)
B29K 101/00 (2006.01)
B29K 105/00 (2006.01)
B29L 9/00 (2006.01)
B29L 31/30 (2006.01)

(52) U.S. Cl.
CPC . *B29K 2995/0094* (2013.01); *B29L 2009/005* (2013.01); *B29L 2031/30* (2013.01); *B29L 2031/3076* (2013.01)

(56) References Cited

U.S. PATENT DOCUMENTS

| | | | |
|---|---|---|---|
| 3,779,882 A | 12/1973 | Rosenthal | |
| 4,588,537 A | 5/1986 | Klaase et al. | |
| 4,592,815 A | 6/1986 | Nakao | |
| 4,894,131 A | 1/1990 | Jacobs et al. | |
| 5,948,483 A * | 9/1999 | Kim | B05B 5/004 |
| | | | 427/483 |
| 6,503,831 B2 | 1/2003 | Speakman | |
| 6,534,129 B1 * | 3/2003 | Miller | B05B 5/14 |
| | | | 118/620 |
| 7,033,713 B2 | 4/2006 | Lelental et al. | |
| 7,098,121 B2 | 8/2006 | Mori et al. | |
| 7,163,611 B2 | 1/2007 | Volkel et al. | |
| 9,348,231 B2 | 5/2016 | Johnson et al. | |
| 9,700,629 B2 | 7/2017 | Johnson et al. | |
| 2002/0005391 A1 * | 1/2002 | Schaffer | B82Y 10/00 |
| | | | 257/E21.242 |
| 2002/0008015 A1 | 1/2002 | Kosakai et al. | |
| 2009/0004609 A1 | 1/2009 | Yang et al. | |
| 2010/0196528 A1 | 8/2010 | Kamata et al. | |
| 2011/0233820 A1 | 9/2011 | Watanabe et al. | |
| 2013/0001204 A1 * | 1/2013 | Mistry | H01H 1/24 |
| | | | 118/620 |
| 2013/0065042 A1 | 3/2013 | Esser-Kahn et al. | |
| 2013/0066045 A1 | 3/2013 | Bellan et al. | |
| 2013/0251945 A1 * | 9/2013 | Bay | B29C 59/04 |
| | | | 264/299 |
| 2014/0327188 A1 | 11/2014 | Naganuma et al. | |
| 2015/0021161 A1 | 1/2015 | Johnson et al. | |
| 2015/0022790 A1 | 1/2015 | Johnson et al. | |

OTHER PUBLICATIONS

Esser-Kahn et al, "Three-Dimensional Microvascular Fiber-Reinforced Composites", Adv. Mater. 2011, 23 3654-3658.
Hansen et al, "Self-Healing Materials with Interpenetrating Microvascular Networks", Advanced Materials, 21(41):4143-4147.
Williams et al, "Biomimetic Reliability Strategies for Self-Healing Vascular Networks in Engineering Materials", J.R. Soc. Interface (2008) 5, 735-747.
3M Scotch-Weld™ Structural Adhesive Film AF 163-2 Technical Datasheet (Nov. 2009).
Wu et al, "Photoinitiation Systems and Thermal Decomposition of Photodefinable Sacrificial Materials", J. Applied Polymer Science, vol. 88, 1186-1195 (2003).
Cognard, "Adhesives and Sealants—General Knowledge, Application Techniques, New Curing Techniques—Handbook of Adhesives and Sealants vol. 2", (2006) Chapter 4, p. 233-302.
Aragón et al, "Design of Microvascular Flow Networks Using Multi-Objective Genetic Algorithms", Comput. Methods Appl. Mech. Engrg. 197 (2008) 4399-4410.
Zhu et al, "Influence of Voids on the Tensile Performance of Carbon/Epoxy Fabric Laminates", J. Mater. Sci. Technol., 2011, 27(1), 69-73.
Chen et al, "Self-Healing Sandwich Structures Incorporating an Interfacial Layer with Vascular Network", Smart Mater. Struct. 22 (2013) 025301.

* cited by examiner

SYSTEM FOR CREATING A STRUCTURE INCLUDING A VASCULATURE NETWORK

This application is a continuation/divisional of U.S. application Ser. No. 14/310,071; filed Jun. 20, 2014 (US Publication No. 2015/0367540A1).

BACKGROUND

The present exemplary embodiments generally relate to multi-layered composite structures and find particular application in connection with systems and methods for the production of multi-layered integral vasculature networks incorporated within such structures, and will be described with particular reference thereto. It is to be understood, however, that it also finds application in other usage scenarios, and is not necessarily limited to the aforementioned exemplary embodiment.

Fiber-reinforced composites are widely and increasingly used in military and commercial systems alike for their light weight and easily tailored structural properties. For example, in a Boeing 787, more than 50% of the aircraft is composites by weight, and composite laminates makeup almost all the exposed areas of the aircraft. Though variations exist, carbon-fiber composites are generally constructed by laying down many layers of carbon fiber pre-preg or pre-impregnated carbon fiber sheets employing various fiber orientations for mechanical property control. Pre-preg or pre-impregnated layers are alternated with layers of epoxy and in some cases honeycomb or foam; these are stacked on a 3D mold and then cured.

Unfortunately, these structures are not damage-tolerant and introduce severe thermal management challenges when combined with increasing levels of electrical actuation and control. Integrated vasculature networks allow straightforward solutions to both of these challenges by allowing integration of cooling networks into wing surfaces or delivery of self-healing compounds, among other uses. Such a network, for example, might need to distribute fluid throughout multiple layers of the structure without increasing weight and decreasing strength. Further, adding a vasculature channel network to a large area composite structure has numerous applications, such as enhanced thermal management, enhanced signature control, adaptive camouflage and erosion damage repair, among other uses. Ideally, the process to fabricate the vasculature network also would be fully compatible with existing composite tooling to enable simple process integration while adding this new advanced functionality.

There have been several attempts to introduce a vasculature network into existing composite structures. In one attempt, tubes were inserted into a foam core/epoxy-glass laminate structure yielding a low impact on strength; however, a significant weight increase of almost 30% was observed. In another attempt, a sacrificial polylactide (PLA) polymer weave was utilized to fabricate microchannels. However, this method was unable to lay down channels with significant feature scales and interweaving these channels with the fiber reinforcement complicated the fiber design and necessitated compromises in optimal mechanical strength. A number of printed options have also been explored including an effort to print a fugitive ink matrix of interpenetrating fluid networks. Although this methodology enabled a range of features sizes, this 3D printing technology lacks the ability to translate to large areas.

These unsatisfactory realizations of vasculature are far from what is required for useful application. Beyond the aforementioned requirements, for a thermal management or erosion control application, the vasculature network must be able to deliver fluid across as much of the surface area as possible. Fabrication must be both repeatable and reliable—the same network must exist in all units and be free of defects that may block fluid flow. The network must also have a tight feature density, span multiple length scales and be easily adapted to the complexity of a large area in order to optimize the vasculature network not only for functionality, but power and weight requirements of any supporting systems. For example, the skin of an aircraft wing contains significant numbers of fasteners, mating features and connectors that would require a large variety of vasculature structures to achieve optimal fluid distribution. A simple repetitive vasculature structure that does not route the fluid around these structures in an intelligent way will have inferior performance.

The best existing methods for creating vasculature give structures that are both weaker and heavier and are also completely incompatible with fiber-reinforced composite layup manufacturing processes.

The present exemplary embodiments provide new systems and methods which overcome the above-referenced problems and others.

INCORPORATION BY REFERENCE

U.S. patent application Ser. No. 13/944,843 (US Publication No. 2015-0022790 A1, published Jan. 22, 2015) for CONTINUOUSLY PRODUCING DIGITAL MICRO-SCALE PATTERNS ON A THIN POLYMER FILM, by Johnson et al., filed Jul. 17, 2013 (now U.S. Pat. No. 9,348,231, issued May 24, 2016) and U.S. patent application Ser. No. 13/944,851 (US Publication No. 2015-0021161 A1, published Jan. 22, 2015) for CONTINUOUSLY PRODUCING DIGITAL MICRO-SCALE PATTERNS ON A THIN POLYMER FILM, by Johnson et al., filed Jul. 17, 2013 (now U.S. Pat. No. 9,700,629, issued Jul. 11, 2017), and U.S. Pat. No. 7,163,611 for CONCENTRATION AND FOCUSING OF BIOAGENTS AND MICRON-SIZED PARTICLES USING TRAVELING WAVE GRIDS, by Volkel et al., issued Jan. 16, 2007, are each hereby incorporated herein by reference in their entireties.

BRIEF DESCRIPTION

In accordance with one aspect, a system and method is provided for creating a structure including a vasculature network. A film deposition device is configured to dispense droplets onto a surface of a substrate to form a curable fugitive pre-patterned liquid film on the surface of the substrate. An electrohydrodynamic film patterning (EHD-FP) device has a patterned electrode structure formed to generate an electric field and to subject the film on the surface of the substrate to the electric field. The film thereby being formed by the EHD-FP into patterned features in response to being subjected to the electric field. Then a casting system is configured to cover the patterned features in an epoxy to form patterned structures, wherein the patterned structures comprise a fugitive vasculature structure.

BRIEF DESCRIPTION OF THE DRAWINGS

The exemplary embodiments may take form in various components and arrangements of components, and in various steps and arrangements of steps. The drawings are only for purposes of illustrating the preferred embodiments and are not to be construed as limiting the present exemplary embodiment.

DETAILED DESCRIPTION

The present exemplary embodiments provide systems and methods for producing vasculature networks using electrohydrodynamic film patterning (EHD-FP) in composite structures.

Overview

EHD-FP involves electrically transferring structures (including but not limited to micro- or nano-structures) formed on a template onto a film, such as a liquid polymer or ceramic film, by shaping the surface of the liquid film through a balance of applied forces on the liquid and the surface tension of the liquid. The liquid film commonly being a thin film. Specifically, the present exemplary embodiments provide systems and methods for adding a vasculature channel network to a composite structure, (including but not limited to a large area composite structure) for numerous applications, such as enhanced thermal management, enhanced signature control, adaptive camouflage and erosion damage repair, among other implementations. As mentioned above, existing methods for creating vasculature networks give structures that are both weaker and heavier and are also completely incompatible with fiber-reinforced composite layup manufacturing processes. The present exemplary embodiments provide methods and systems of creating cured fugitive (temporary sacrificial templates) vasculature networks within epoxy layers of a composite network using the EHD-FP process. These methods have minimal impact on material performance and no weight impact, and are capable of reliably distributing fluid in the structures. The systems can also be integrated easily into large scale 3D composite structures due to their digital and scalable nature.

Figure 1:
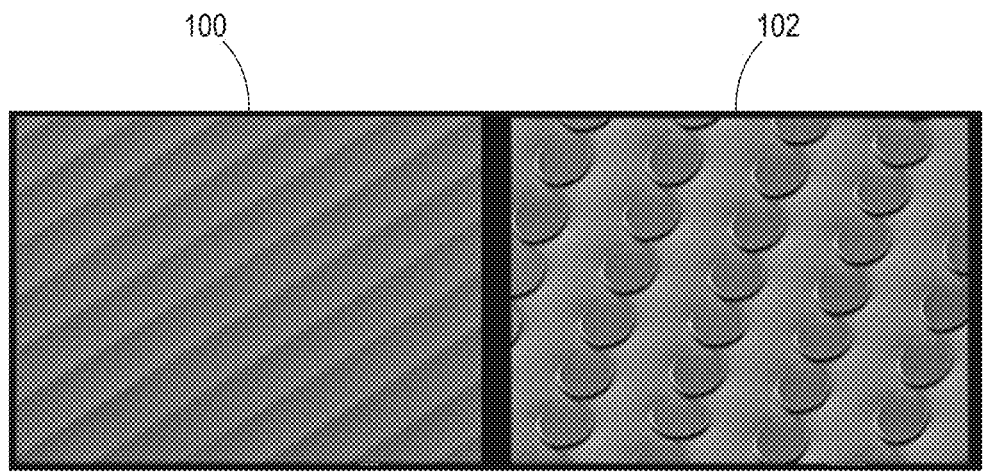
FIG. 1 is an exemplary illustration of an electrode structure resulting from a patterning process with patterned electrodes.

In one exemplary embodiment, the EHD-FP vasculature process works by electrically destabilizing the interface between two fluids. While the process can work with an unstructured electrode, in this implementation the electrode structure is patterned, allowing a pre-determined geometric pattern or layout to be replicated in the thin film. As shown in FIG. 1, these features can be near arbitrary in their topology depending on their design intent. Geometry ranging in size from 10's of microns to millimeters can easily be patterned at the same time. Specifically, FIG. 1 illustrates an electrode structure resulting from a patterning process with patterned electrodes with 5 micron wide electrodes with 200-300 micron spacing (100) and/or 8.2 micron spacing pillars (102). The patterning ability is similar to that offered by some lithographic methods, but unlike lithographic methods, the EHD patterning process draws fluid up from a thin film instead of etching it away, making the process easily adaptable to a wide range of fluids and more easily integrated into a process.

In one embodiment of the present disclosure EHD-FP vasculature process involves forming a polymer thin film (or feed film) so that the thin film is entirely formed into features and broken up into discrete liquid polymer "islands" as the applied electric field causes vertical growth of the features (i.e., if insufficient liquid polymer surrounds the features, which may be micro-scale, nano-scale or other sized features, then the features become separated from each other). Subsequent curing "freezes" (solidifies) the discrete features to form a plurality of said solid patterned structures disposed in a spaced-apart arrangement on a conductive substrate.

The nature of the formation of these islands can be manipulated by changing the structure of the feed film. If the starting feed film is not evenly spread across the substrate, it will feed into the produced features unevenly and some sides of a feature can be connected, while others are disconnected. In this manner, a highly structured vasculature network can be constructed. As will be expanded upon in the following discussion, one manner of providing an uneven feed film is to use an inkjet printer type device to dispense droplets in accordance with a predetermined pattern.

EHD-FP Systems and Processes

In addition to being able to reproducibly replicate the complex patterns required for a useful vasculature network, the EHD-FP vasculature process is able to be scaled up to a high-speed roll-to-roll or belt system. FIGS. 2-8 and the accompanying text provides a detailed discussion of aspects and embodiments of various EHD-FP systems and processes. As used in the following discussion, directional terms such as "upper", "lower", "upstream" and "downstream", are intended to provide relative positions for purposes of description, and are not intended to designate an absolute frame of reference. In addition, the phrase "integrally connected" is used herein to describe the connective relationship between two portions of a single structure, and are distinguished from the terms "connected" or "couple" (without the modifier "integrally"), which indicates two separate structures that are joined by way of, for example, adhesive, fastener, clip, or movable joint.

Figure 2:
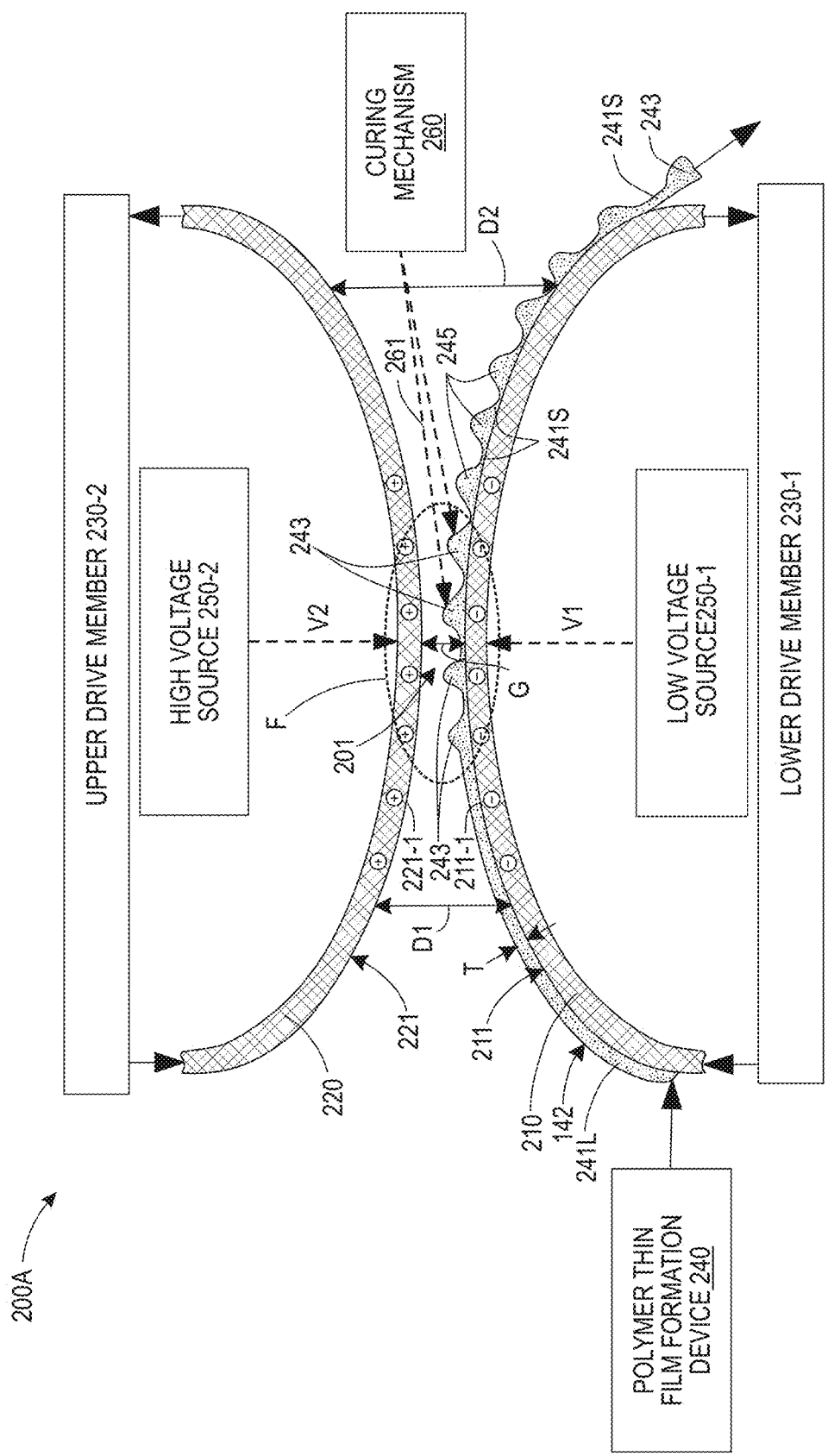
FIG. 2 is a cross-sectional side perspective view depicting a system employed in the present disclosure.

Turning now to FIG. 2 depicted is an EHD-FP system 200A for continuously producing digital micro-scale patterned (polymer) features on a thin film. System 200A generally includes a lower (first) conveyor 210, an upper (second) conveyor 220, associated conveyor drive mechanisms 230-1 and 230-2, a thin film formation device 240, an electric field generator (indicated by low voltage source 250-1 and high voltage source 250-2), and an optional curing mechanism 260.

Conveyors 210 and 220 are implemented by any conveying device (e.g., such as rollers or belts) that provide a curved surface capable of translating (moving) a liquid polymer thin film through a narrow gap region. Specifically, lower conveyor 210 has a lower (first) conveyor surface 211 that is supported and constrained to move along a corresponding first curved (e.g., circular or oblong) path, and second conveyor 220 has an upper (second) conveyor surface 221 that is supported and constrained to move along a corresponding second curved path. The curved paths associated with conveyors 210 and 220 are arranged such that conveyor surfaces 211 and 221 are separated by minimum distance G at a gap region 201, are separated by a relatively large first distance D1 at a "upstream" location from gap region 201, and a relatively large second distance D2 at an "downstream" location from gap region 201, where distances D1 and D2 are much larger than minimum gap distance G. For purposes that are described below, both lower conveyor 210 and upper conveyor 220 comprise an electrically conductive or dielectric material that maintains a potential across gap region 201 during operation. In one embodiment, lower conveyor 210 includes an electrically conductive metal or polymer, or is optionally coated with an electrically conductive and transparent material such as Indium-Tin Oxide (ITO). Upper roller 220 also includes an electrode pattern (described below), or includes an electrically conductive metal or polymer.

According to an aspect of the present disclosure, lower conveyor 210 and upper conveyor 220 are respectively driven by lower drive member 230-1 and upper drive member 230-2 (e.g., motors and/or belts) such that surfaces 211 and 221 move at matching speeds through gap region 201. Specifically, surfaces 211 and 221 are moved along their respective paths such that each (first) surface region 211-1 of lower surface 211 passes through gap region 201 substantially simultaneously with a corresponding (second) surface region 221-1 of upper surface 221.

Referring to the left side of FIG. 2, thin film formation device 240 is a coating device or other mechanism suitable for disposing a curable liquid polymer thin film 241L on lower conveyor surface 211 at a point that is upstream from gap region 201, whereby thin film 241L is subsequently conveyed into gap region 201 by normal movement of lower conveyor 210. For example, device 240 deposits a thin film (first) portion 241-1 of a liquid polymer (e.g., polystyrene, polyvinyl alcohol (PVA), Polyvinylpyrrolidone (PVP), Polyethylene glycol (PEG) or OrmoStamp® UV cure polymer) on surface region 211-1 of lower conveyor surface 211, and subsequent movement of lower conveyor surface 211 causes portion 241-1 to move into gap region 201. In one embodiment, thin film formation device 240 is implemented by a slot coater or digital ink jet printer type device that reliably creates thin film 241L having a thickness (height) T (measured from conveyor surface 211 to an upper surface 242 of thin film 241) in the range of 1 to 100 microns). In other embodiments, other coating devices (e.g., a slot die coating system, a slide coating system, or a curtain coating system) that reliable create thin films having a few microns thickness are used.

According to another aspect of the present disclosure, low voltage source 250-1 and high voltage source 250-2 generate an electric field F between lower conveyor 210 and upper conveyor 220, for example, by respectively applying a low voltage V1 and high voltage V2 (e.g., 0V and 100V, respectively) to the electrically conductive material disposed on conveyors 210 and 220. The strength of electric field F is determined by the relative distance between the relatively low and relatively high charges generated by voltages V1 and V2, which are indicated by "+" and "−" in FIG. 2 for descriptive purposes only (e.g., one of the charges may be 0V or the polarity of the charges may be reversed). That is, due to the curved path followed by conveyor surfaces 211 and 221, electric field F is highest (strongest) in gap region 201 (i.e., due to minimal gap distance G), and decreases (weakens) on either side of gap region 201 in accordance with the associated spacing distance between surfaces 211 and 221. In accordance with an aspect of the present disclosure, voltages V1 and V2 are selected such that electric field F is sufficient to cause polymer liquid thin film 241L to undergo EHD-FP processing (deformation) as polymer liquid thin film 241 passes into and through gap region 201, thereby forming patterned liquid polymer features 243 in liquid polymer thin film 241L. Specifically, due to EHD patterning, patterned liquid polymer features 243 in the form of raised ridges or pillars are formed by liquid polymer drawn from surrounding portions of thin film portion 241, whereby each patterned liquid polymer feature 243 extends upward from conveyor surface 211 into gap region 201 (i.e., toward upper conveyor 220). By controlling the strength of the electric field F and by utilizing suitable polymer characteristics (e.g., viscosity), patterned liquid polymer features 243 exhibit a micro-scale patterned shape (i.e., the width and height of each patterned liquid polymer feature 243 is on the order of 1 to 100 microns) in gap region 201.

According to another aspect of the present disclosure, the EHD patterned liquid polymer features 243 and any surrounding polymer material are cured before the thin film polymer material passes out of electric field F. Referring to the right side of FIG. 2, curing mechanism 260 acts to solidify each patterned liquid polymer feature 243 (i.e., when it is located inside gap region 201, or immediately after it exits gap region 201 but is still subjected to electric field F) and the surrounding polymer material, thereby forming solid micro-scale patterned structures 245 extending from solidified polymer thin film 241S, where each micro-scale patterned structure 245 has substantially the same micro-scale patterned shape as that of its precursor liquid polymer feature 243. The specific curing mechanism 260 utilized in each instance is determined by the type of polymer material forming thin film 241L (e.g., if a UV curable polymer is used, then curing mechanism 260 is implemented by a UV curing system, e.g., that directs a UV laser beam 261 onto portions of thin film 241L disposed in gap region 201). In other embodiments, depending on the type of polymer used, curing mechanism 260 is implemented by, for example, a visible light curing system or a focused thermal curing system.

Referring to the lower right portion of FIG. 2, subsequent to the curing process (i.e., downstream from gap region 201), solidified polymer thin film 241S is removed from lower conveyor 110 for further processing. Note that micro-scale patterned structures 245 remain spaced apart and extend upward from solidified polymer thin film 241S.

Figure 3:
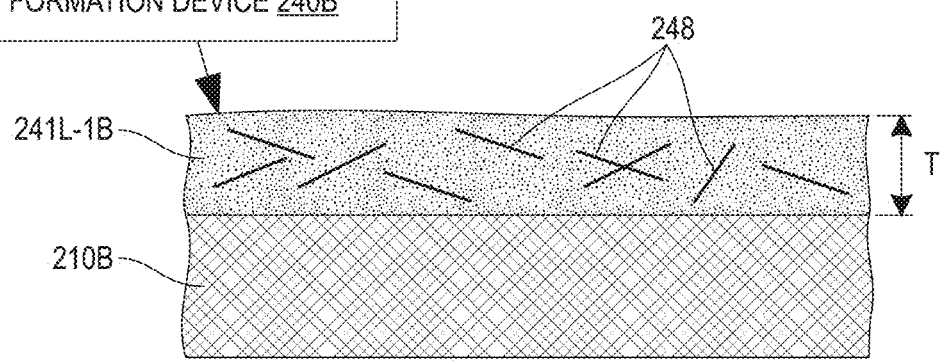
FIG. 3 is an enlarged cross-sectional side view showing a polymer thin film containing nanostructures.
Figure 4:
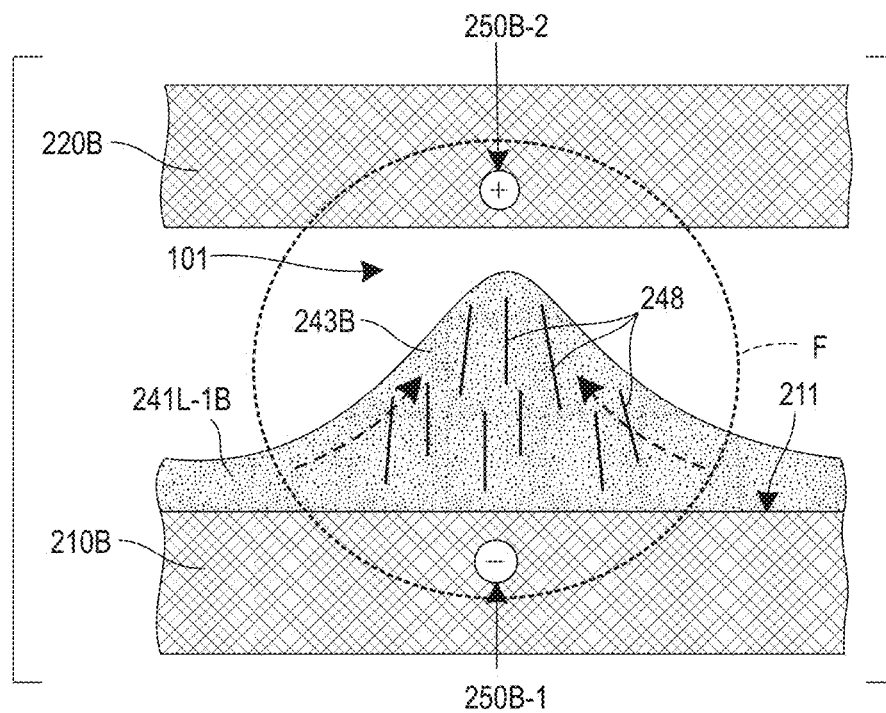
FIG. 4 is an enlarged cross-sectional side view showing the formation of micro-scale patterned features containing the nanostructures of FIG. 3 according to a specific embodiment of the present disclosure.

FIGS. 3 and 4 illustrate a unique attribute of the modified EHD-FP approach of the present disclosure in which "loaded" polymer thin films contain nanostructures that are inherently aligned during the formation of micro-scale polymer structures, thereby facilitating the production of a wide variety of highly valuable commercial applications.

FIG. 3 is a partial cross-sectional view showing a liquid polymer thin film portion 241L-1B including nanostructures 248 (e.g., carbon nanotubes or GaAs nanowires). In this case, a polymer/nanostructure thin film formation device 240B (e.g., one of coating systems mentioned above that is optimized to deposit the modified polymer/nanostructure material) forms liquid polymer thin film portion 241L-1B having thickness T on lower conveyor 210 utilizing the structures similar to those described above with reference to FIG. 2. Note that nanostructures 248 are dispersed with initial (e.g., random or non-random) orientations within liquid polymer thin film portion 121L-1B at deposition.

FIG. 4 shows liquid polymer thin film portion 241L-1B when it is disposed in gap region 201 between lower conveyor 210 and upper conveyor 220 in a manner similar to that described above with reference to FIG. 2. As described above, electric field F generated by voltage sources 250B-1 and 250B-2 causes EHD-FP deformation, whereby liquid polymer material flows inward and upward (as indicated by the dashed-line arrows) to form a patterned liquid polymer feature 243 that extends from liquid polymer thin film portion 241L-1B toward upper conveyor 220. In addition, wen nanostructures 248 are reactive to an electric field (e.g., carbon nanotubes), nanostructures 248 align in electrical field F and couple to the hydrodynamic forces that result from the pattern formation, producing a generally vertical orientation (i.e., generally perpendicular to surface 211 of lower conveyor 210).

Figure 5:
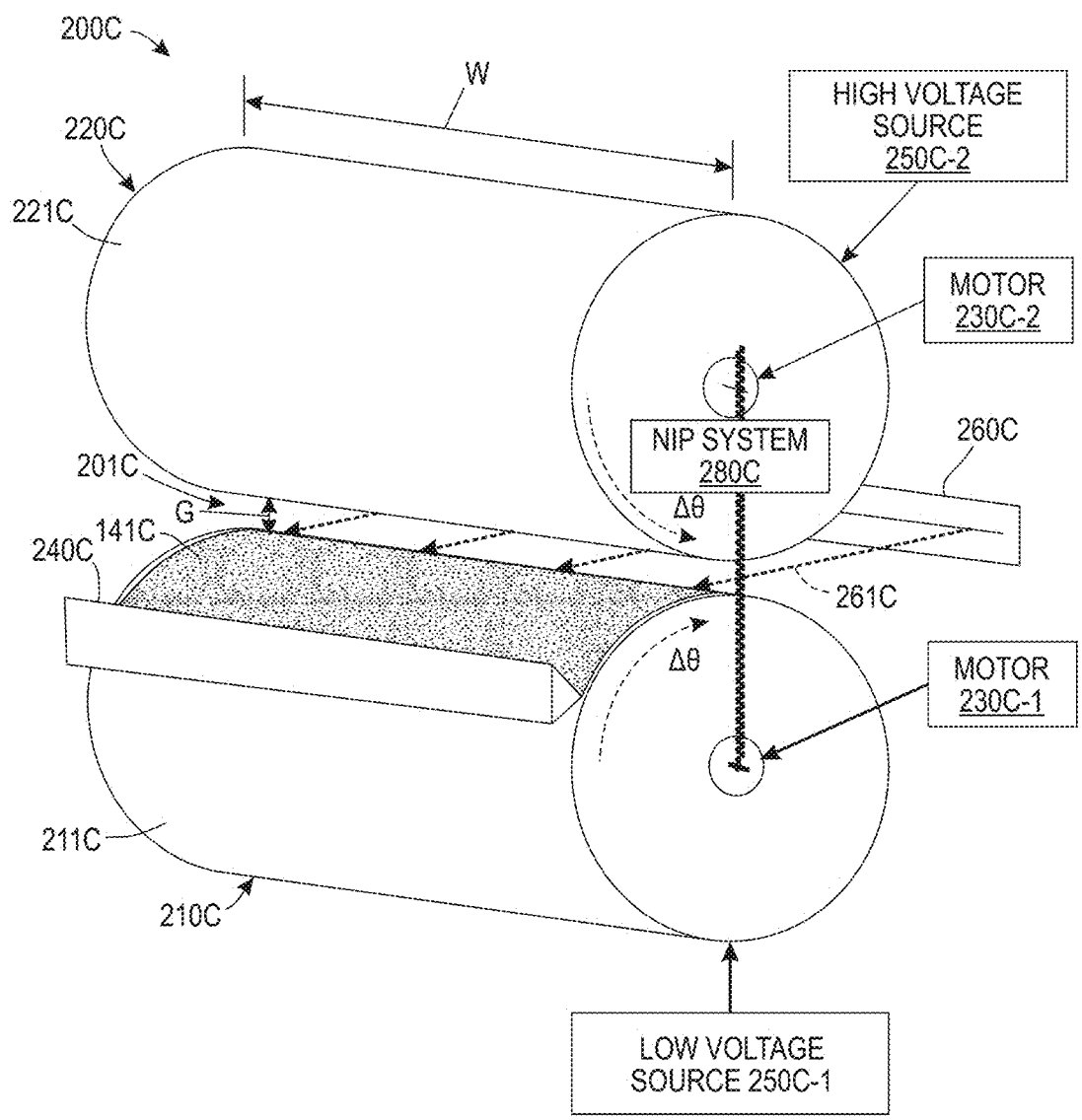
FIG. 5 is a perspective side view showing a simplified roll-to-roll-type system for producing micro-scale patterned structures employed in the present disclosure.

Turning now to FIG. 5 illustrated is a perspective view showing a system 200C according to a practical specific embodiment of the present disclosure in which the generalized conveyors mentioned above are implemented by parallel lower and upper rollers (conveyors) 210C and 220C, the generalized thin film formation device is implemented by a slot coater (or inkjet printer) 240C, and the generalized curing device is implemented by a ultraviolet (UV) light source 260C, where these specific devices are controlled to perform a production method consistent with the generalized methods described above.

Referring to the lower portion of FIG. 5, lower roller 210C is operably coupled to low voltage source 250C-I such that it acts as the ground in the electric field circuit. To generate the electric field, the outer peripheral portions of lower roller 210C are made up of either an electrically conductive metal or an electrically conductive polymer, or outer surface 211C is optionally coated with an electrically conductive and/or transparent material such as ITO.

Top roller 520C is operably coupled to high voltage source 250C-2 that supplies one or more high voltage signals to generate the applied electric field circuit. In one embodiment, outer surface 221C of top roller 220C includes a continuous conductive layer that is electrically active across the entirety of roller surface 221C. In other embodiments (discussed in additional detail below), top roller 220C includes either an electrode pattern or a dielectric material to which a charge pattern is applied.

Lower roller 210C and upper roller 220C are driven by one or more motors 230C-I and 230C-2 using techniques known in the art such that each region of surface 211C through nip-type gap region 201C substantially simultaneously with a corresponding region of surface 221C (i.e., rollers 210C and 220C are driven at matching speeds). Lower roller 210C and upper roller 220C are maintained by a support structure (also not shown) such that they remain separated by a fixed minimum distance G at a nip (gap) region 201C. A conventional high precision nip system 280C, which is operably connected between the axis of rollers 210C and 220C to facilitate adjustment of minimum distance G using known techniques, serves to guarantees high roller distance dimensional control.

Slot coater (or digital inkjet printer) 240C coats (deposits) liquid polymer thin film 241C either directly onto cylinder roller surface 211C of lower roller 210C, or onto a support web (not shown) that is disposed over surface 211C. Slot coaters capable of performing this function are well known in the art. When polymer film 241C enters nip region 201C, it either replicates the pattern of electrodes disposed on upper roller 220C in the manner described below, or sets up a pattern based on the natural instability of the polymer system as described above.

To facilitate curing near the nip (gap) region 201C between rollers 210C and 220C, UV curable polymers are utilized because of their fast fixing time, and "fixing" N mechanism is implemented by a system 260C (e.g., one of an Ultra Violet (UV) curing system, an visible light curing system, and a focused thermal curing system) that directs beam 261C onto a location adjacent to nip-type gap region 201C. Specifically, after passing through nip region 201C, beam 261C is applied such that the polymer is cross-linked and hardens into the solid micro-scale pattern shapes enforced on the liquid polymer by the applied electric field. UV laser systems capable of performing this curing function are well known in the art. In an alternative embodiment the curing system is disposed inside one of rollers 210C and 220C, and is directed through transparent roller material into gap region 201C. Solidified polymer film (not shown) is then removed from lower roller 210C and moved downstream for any additional steps that might be required.

The production output of system 200C is limited by two factors: the width W of rollers 210C and 220C, and the rotational speed Δθ of rollers 210C and 220C. Roller width W is limited by the physical ability to both manufacture and install rollers 210C and 220C within the tolerances required. These tolerances are similar to those in typical slot coating (or digital inkjet printing) systems, which can reasonably be expected to maintain a 0.5 micron tolerance over 3.5 meters. For one such realization of 8 micron features with a 2 micron tolerance, this leads to a maximum output of 1.3 m/s with fast UV cure times. The width can be increased and the sensitivity of the film pattern to machine tolerances can be adjusted for by varying the applied voltage through a number of electrode addressing schemes that are explained in further detail below.

Figure 6:
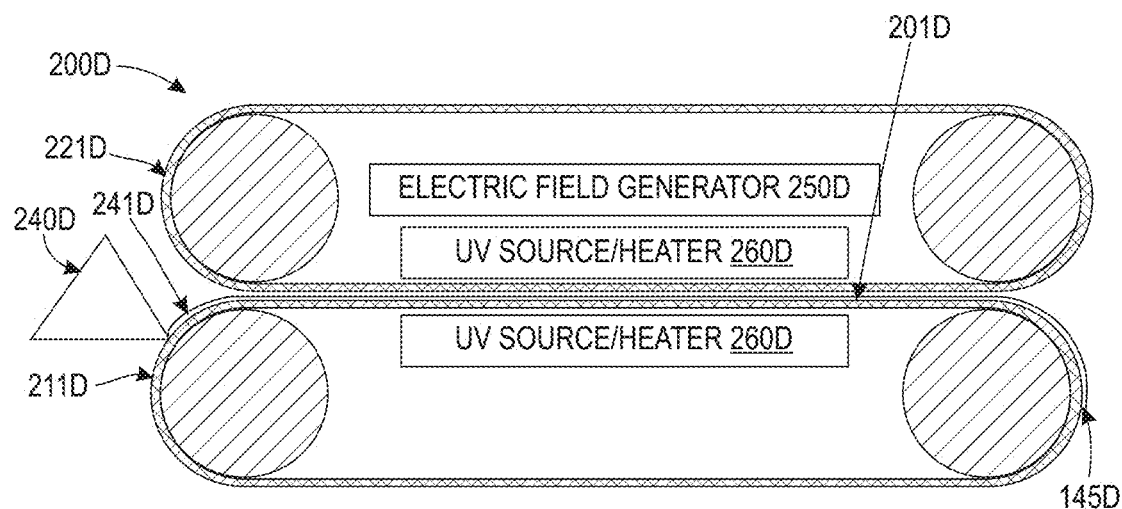
FIG. 6 is a cross-sectional side view showing a simplified belt-to-belt-type system for producing micro-scale patterned employed in the present disclosure.

FIG. 6 is a simplified cross-sectional side view showing a system 200D according to another practical embodiment of the present disclosure. System 200D is characterized by a belt-to-belt arrangement formed by a lower belt-like conveyor 210D and an upper belt-like conveyor 220D that are positioned to define an elongated gap region 201D between opposing planar regions of lower belt surface 210D and upper belt surface 221D. A thin film deposition device (e.g., a slot coater or digital ink jet printer) 240D is disposed to form a liquid polymer thin film 241D on lower belt surface 211D prior to entering gap region 201D, and voltage sources (not shown) are connected as described above to conductive material formed on the belts to generate the desired electric field inside elongated gap region 201D.

The belt-to-belt arrangement of system 200D is similar to the roll-to-roll arrangement of 200C, but instead of a small nip-type gap area of the roll-to-roll arrangement, system 200D provides a large gap region that allows more time for the formation of the micro-scale pattern features. This arrangement facilitates the use of thermosetting polymers by facilitating thermal curing (e.g., by way of thermal curing systems (heater blocks) 260D disposed along the inside surface of the belt material adjacent to elongated gap region 201D). To facilitate thermal curing, the belts are formed, for example, using a thermally conductive material, or a transparent material for admitting IR light into elongated gap region 201D.

In order to maintain the tight tolerances required for the belt-to-belt process shown in FIG. 6, belt-like conveyors 210D and 220D must be held close by way of alignment blocks. This can be achieved, for example, with significant amounts of tension or interlocking parts that slide in and out of the block.

Due to the longer processing time provided by elongated gap region 210D, belt-to-belt system 200D facilitates operations that do not require a curing device (i.e., system 200D). In this case, polymer 241D is heated and applied in a melted state onto surface 211D upstream of gap region 201D. The polymer temperature is high enough to maintain the melted state as the polymer is patterned by the applied electric field in the manner described above. Once the pattern has been established, the polymer is allowed to cool below the polymer's melting point temperature to form solid micro-scale patterned structures 245D having one of the forms described above.

According to a particular approach, in order to achieve the most flexibility in creating and controlling the micro-scale patterns, the various systems described above (including both belt and roller embodiments) are modified to include digital patterning control, which is implemented using a dynamic charge generation mechanism that facilitates EHD-FP (i.e., electric field generation) by producing a dynamic (variable) charge pattern on at least one of the conveyor surfaces, whereby the charge pattern defining the electric field is dynamically alterable to compensate for system variances. As set forth in the following exemplary embodiments, such dynamic charge generation is achieved using either segmented electrodes or a charge patterning scheme.

Figure 7:
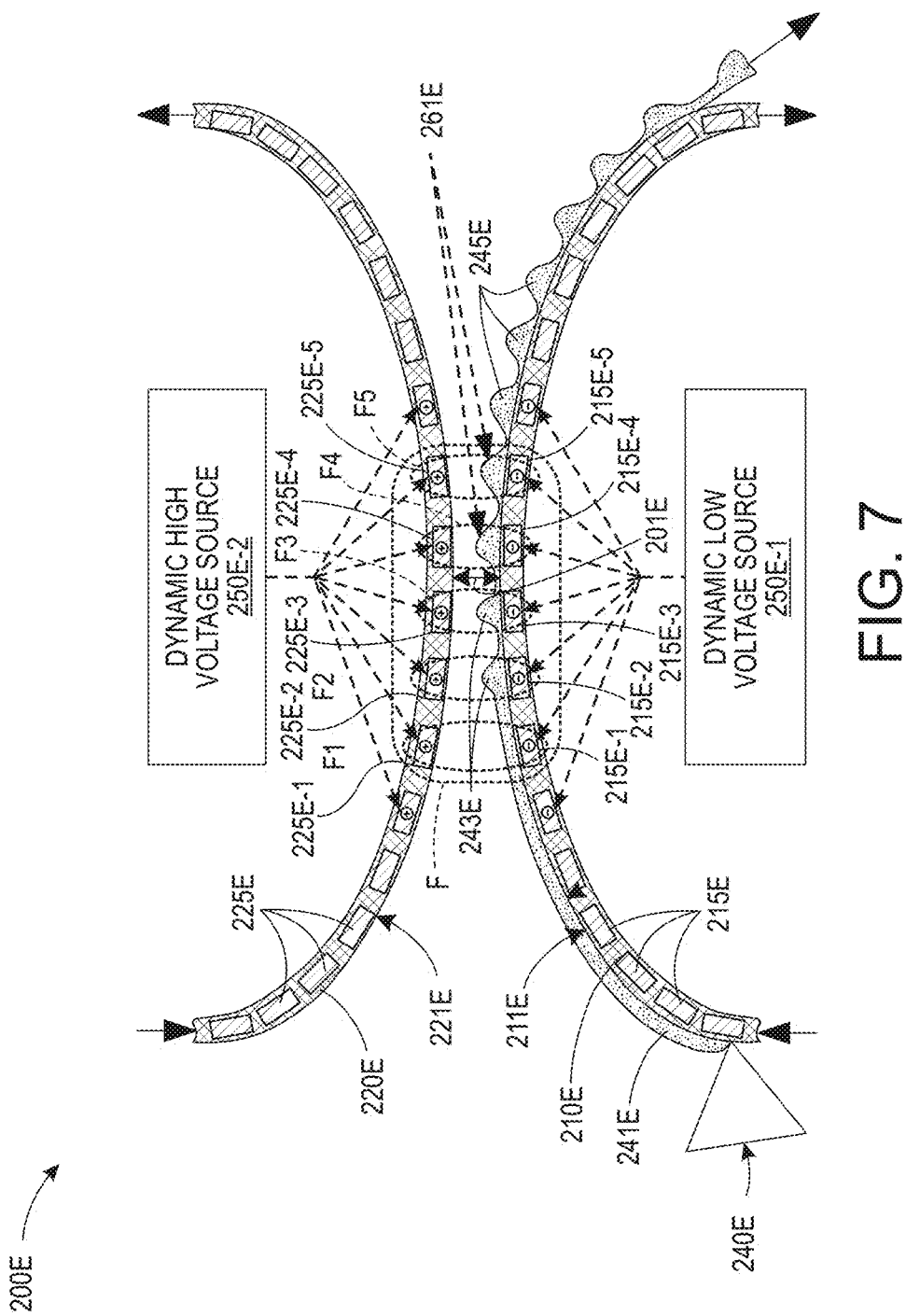
FIG. 7 is a cross-sectional side view showing a simplified system for producing micro-scale patterned structures using separated electrodes employed in present disclosure.

FIG. 7 is a simplified diagram depicting a system 200E which includes a lower (first) conveyor 210E and an upper (second) conveyor 220E that are constructed and arranged to convey a polymer thin film 241E through a gap region 201E, where thin film 241E is generated on lower conveyor surface 211E by a suitable device 240E and patterned by an electric field F to form features 243E that are subsequently cured (e.g., by way of UV light 261E) to form micro-scale structures 245E in a manner similar to that described above.

System 100E is characterized in that at least one of conveyors 210E and 220E includes segmented electrodes that are digitally addressable by a dynamic voltage source (electric field generator) such that each individual electrode receives an associated charge (voltage) having a value determined, e.g., by experimental measurement performed prior to production operations. Specifically, upper conveyor 220E includes segmented upper electrodes 225E that are individually addressable by dynamic high voltage source (electric field generator) 250E-2 such that each individual upper electrode (e.g., electrodes 225E-I to 225E-5) receives an associated (e.g., unique/different or common/same) voltage value. Alternatively (or in addition), lower conveyor 210E includes segmented lower electrodes 215E that are digitally addressable by dynamic low voltage source (electric field generator) 250E-2 such that each individual lower electrode (e.g., electrodes 215E-1 to 215E-5) receives an associated voltage value. Sources 250E-1 and 250E-2 are electronic circuits produced in accordance with known techniques to generate and deliver associated voltage values such that each segmented electrode (or each upper/lower electrode pair) produces an associated portion of electric field F having an associated field strength. For example, upper electrode 225E-1 (or the pair formed by upper electrode 225E-1 and lower electrode 215E-1) generate electric field portion F1 in the region between conveyor 210E and 220E. Similarly, electrodes 225E-2 to 225E-5 (or pairs 225E-2/215E-2, 225E-3/215E-3, 225E-4/215E-4 and 225E-5/215E-5) generate electric field portions F2 to F5, respectively.

With continuing attention to FIG. 7, segmented electrodes 225E allow digital control over the electric field generated in gap region 201E during EHD patterning by facilitating the transmission of predetermined unique (different) or identical voltage values to each electrode, thereby allowing electrical correction (if needed) for physical variances that inevitably arise in large systems requiring precise tolerances, such as system 200E. That is, differences in localized electric field values F1 to F5, which may be caused by electrode distance variations between neighboring electrodes 225E-1 to 225E-5 or between paired electrodes (e.g., electrodes 215E-I and 225E-1) across gap region 201E, are correctable by transmitting a predetermined unique "high H voltage to each electrode 225E-1 to 225E-5. For example, each electrode 225E-1 to 225E-5 is individually addressed by dynamic high voltage source 250E-2 and receives an associated voltage whose value is set such that each associated voltage whose value is set such that each associated electric field portion also has a uniform field strength. Exemplary segmented electrodes with individual addressing schemes suitable for implementing electrodes 215E and 225E are disclosed in co-owned U.S. Pat. No. 7,163,611, entitled CONCENTRATION AND FOCUSING OF BIO-AGENTS AND MICRON-SIZED PARTICLES USING TRAVELING WAVE GRIDS, which is incorporated herein by reference in its entirety.

In alternative embodiments, at least some of segmented electrodes 225E have a modified (different) shape (e.g., line or point electrodes) that cover different parts of the "counter H surface depending on the patterns needed. Possible examples of line or point electrodes are disclosed in U.S. Pat. No. 7,163,611 (cited above). Other electrode shapes (e.g., hexagonal or circular) are also possible, e.g., for making custom-shaped micro-scale particles.

In alternative embodiments, the size and distances between electrodes is altered to produce the desired EHD-FP pattern. For example, although FIG. 8 indicates that each electrode pair produces a single separate micro-scale structure 245E, in other embodiments each electrode may be sized to generate multiple features/structures. By controlling the shape of the electrode a competing length scale to the intrinsic $\Lambda$max is introduced, which can either dominate the pattern formation dimension on the 2D plane, or define the area for the intrinsic pillar pattern.

In other alternative embodiments, the voltages (charges) transmitted to each segmented electrode is changed (i.e., increased or decreased) over time, allowing for either custom pattern growth and or compensation of fabrication variations across the patterning area. These voltages can be adjusted dynamically, to either achieve specific quality metrics in the film, or to adjust as processing conditions change leading to an extremely robust process.

Figure 8:
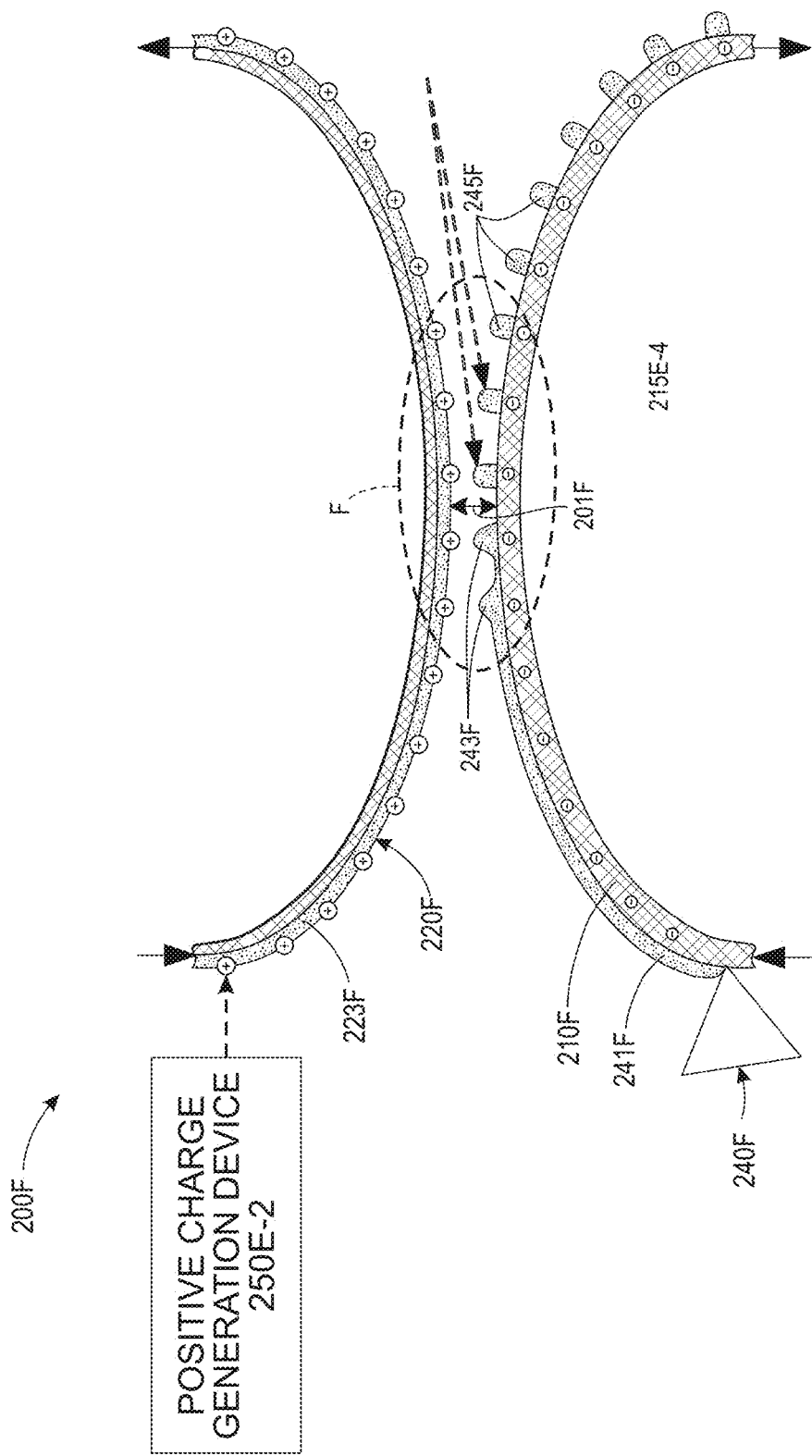
FIG. 8 is a cross-sectional side view showing a simplified system for producing micro-scale patterned structures using applied charge patterns electrodes employed in the present disclosure.

Turning to FIG. 8 illustrated is a simplified diagram depicting another system 200F including a lower (first) conveyor 210F and an upper (second) conveyor 220F that are constructed and arranged to convey a polymer thin film 241F through a gap region 201F, where thin film 141F is deposited by device 240F and patterned by an electric field F to form features 143F that are subsequently cured to form micro-scale structures 245F in a manner similar to that described above. System 200F differs from the previous embodiment in that dynamic charge generation is achieved using well-defined charge patterns that are formed on an appropriate insulating or semiconducting material layer 223F disposed on surface 221F of upper conveyor 220F. In an exemplary embodiment first (e.g., positive) charges are selectively applied in a predetermined pattern on layer 223F by a first (e.g., positive) charge generating device 250F (e.g., a plasma generating device such as a scorotron) upstream of gap region 201F, whereby the first charges generate corresponding portions of electric field F in a manner similar to that described above with reference to the segmented electrode approach. In other embodiments, relatively high charges are applied to the electrodes on lower conveyor 210F, and relatively low charges are applied to the electrodes of upper conveyor 220F. In some embodiments, the charge patterns are achieved by either a masking process, or by a set of plasma generating devices of the required size. In other embodiments, a photo sensitive material, such as a photo receptor film similar to that used in a laser printer, is disposed on the upper conveyor, and the charge pattern is generated by light transmitted onto the photo sensitive material, where laser beam(s) are used to write a charge pattern on a photo receptor. The charge patterning approach provides an advantage in applications where different EHD-FP patterns are needed in subsequent fabrication steps, or in continuous patterning systems (i.e. where each sheet or section of thin film has a different pattern). The charge patterning approach gives the biggest variability on the addressing electrodes, since the charge pattern can be changed easily from one step to the next, especially for the case of optical charge generation (similar to Xerography).

By using addressable charging technology developed for production printing, the described EHD-FP systems operate in a fully digital manner, allowing dynamic, spatially varying patterning and a wide array of possible vasculature networks to be produced without the need for design specific tooling. It should be appreciated the EHD-FP patterning systems are capable of producing practically useful quantities of films with nearly arbitrary vasculature patterns using a wide variety of liquid polymer or ceramic precursors.

Formation of Vasculature Network

In order to apply the EHD-FP patterning technique to create a vasculature network, an integrated process using EHD-FP patterning to create vasculature within components is utilized in the construction of fiber reinforced composites. By doing so the process is fully compatible with existing manufacturing processes. The present exemplary EHD-FP process minimizes the strength and weight tradeoffs demonstrated in prior vasculature production techniques by adding the vasculature to epoxy matrix layers between fiber reinforcement layers so that the structural reinforcement of the fibers is not compromised.

In order to achieve the most flexibility in creating and controlling patterns being processed (including micro-scale, nano-scale, or other sized patterns), the various EHD-FP systems described above (including both EHD-FP belt and roller embodiments) as used herein employ digital patterning control, which is implemented using a dynamic charge generation mechanism that facilitates EHD-FP patterning (i.e., electric field generation) by producing a dynamic (variable) charge pattern, whereby the charge pattern defining the electric field is dynamically alterable to compensate for system variances. As set forth in the following exemplary embodiments, such dynamic charge generation may be achieved using segmented electrodes or a charge patterning scheme.

Figure 9:
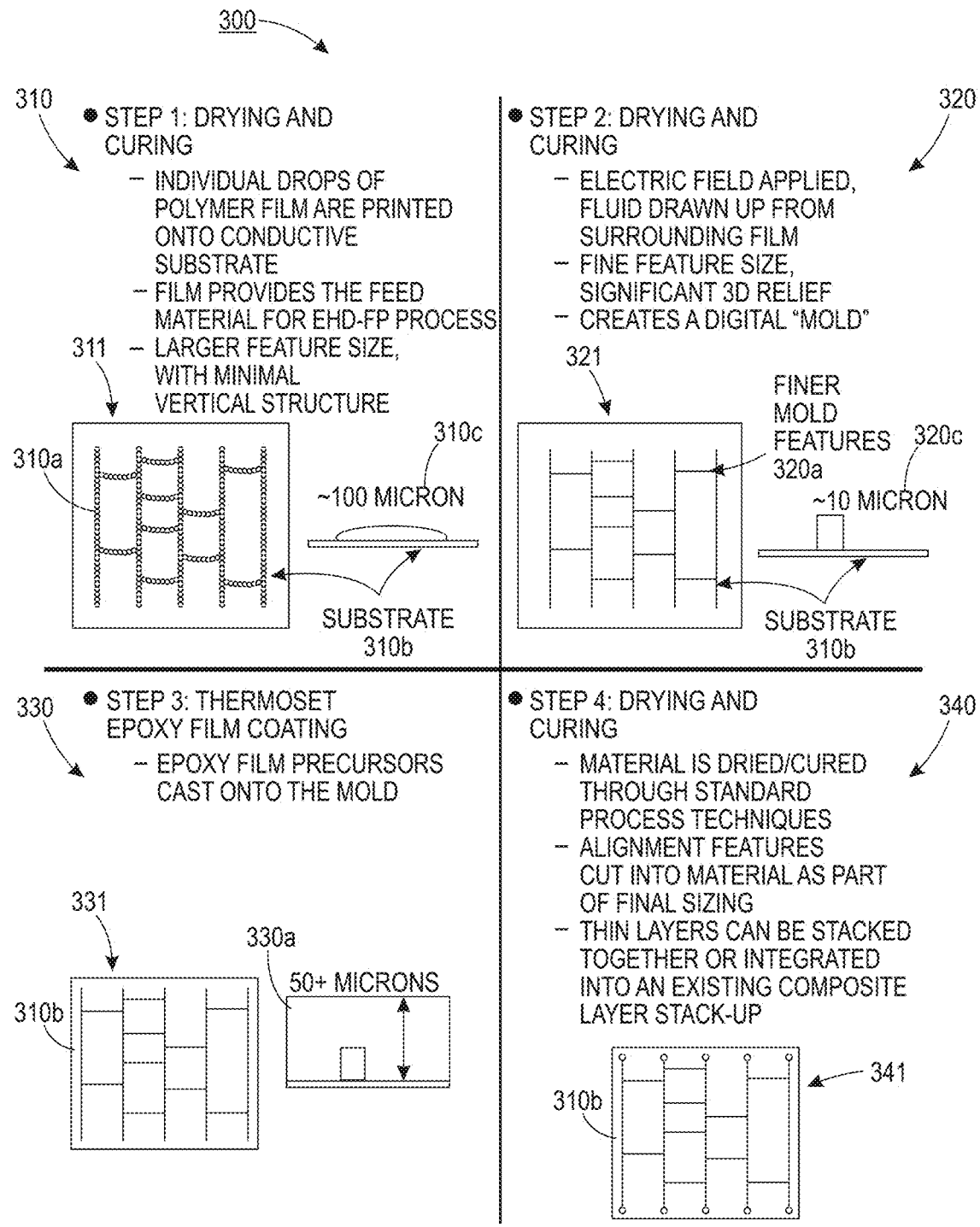
FIG. 9 is an exemplary illustration of a process utilizing EHD patterning to produce a vasculature network.

To create a vasculature network of a fugitive (i.e., sacrificial) material in the epoxy matrix layers, a described four-step process uses EHD-FP to create flexible, fugitive material channels in a matrix film as shown in process 300 of FIG. 9.

In order to create isolated islands of fugitive material and allow for multiple disconnected networks of vasculature within the epoxy layer, a film of fugitive polymer is pre-patterned with a basic structure for larger features (310a), i.e., the features of the pre-patterned basic structure will have features that are more spread out on the substrate than structures that will exist after the EHD-FP operations (step 310). This pre-patterning or printing is accomplished using inkjet printing or other jet printing system, given the digital nature of the starting geometry. The fugitive polymer is specifically formulated to be compatible with the epoxy and flexible yet solid at the cure temperatures of the epoxy. This film provides the feed material for the EHD-FP process.

In a step 320, the fugitive film is then patterned using the EHD-FP process to create both higher resolution (down to 10 microns) channel features and uniform larger (e.g., taller) channel masters or patterned features (320a) that will serve as the vasculature feed channels. Specifically, an electric field is applied to the conductive substrates and fluid is drawn up from the thin film producing the high resolution electrode structure and features. The EHD-FP can be any variant of the process as detailed in FIGS. 2-8.

In step 330, an epoxy matrix film is then cast over the fugitive polymer vasculature master formed in step 320 (e.g., the finer molded features 320a). In the embodiment of FIG. 9, where the fugitive film is patterned down to 10 microns, it is shown the cast epoxy matrix film has a thickness of approximately 50 microns. It is to be appreciated that in alternative embodiments the thicknesses of the vasculature master formed in step 320 and the epoxy matrix film cast in step 330 may be other than 10 microns and 50 microns.

Finally, in step 340, the polymer is post-processed as necessary, including drying, curing and/or winding. Alignment features may be cut into material as part of final sizing, and thin layers can be stacked together or integrated into an existing composite layer stack-up.

Process 300 can be easily integrated into a high volume epoxy film production line. Such a system allows for the patterned epoxy film with the vasculature master to be produced on demand and readily inserted into a complex multi-layered large area and other composite structures. The system can also be directly linked to an automated tape layer machine as known in the art, allowing integral vascular epoxy layers to be inserted into any composite structure with on-demand digital adaptation integrated into the production line.

With continuing attention to FIG. 9, it is to be understood images 311, 321, 331, and 341 are top views looking down onto the substrate 310b surface. On the other hand the ~100 micron image 310c and the ~10 micron image 320c are side views intending to show the nearest view looking the length of those images. It is also noted that while the term digital inkjet printer or system has been used herein, the use of this term is understood to represent any device capable of printing droplets of appropriate material, such as polymers, ceramics, among others, and is intended to include jet type dispensing devices that may be referred to by other names.

Using the patterning process discussed above, the EHD-FP system can create composite layups which contain tailored vasculature throughout the structure within established composites manufacturing techniques.

Figure 10:
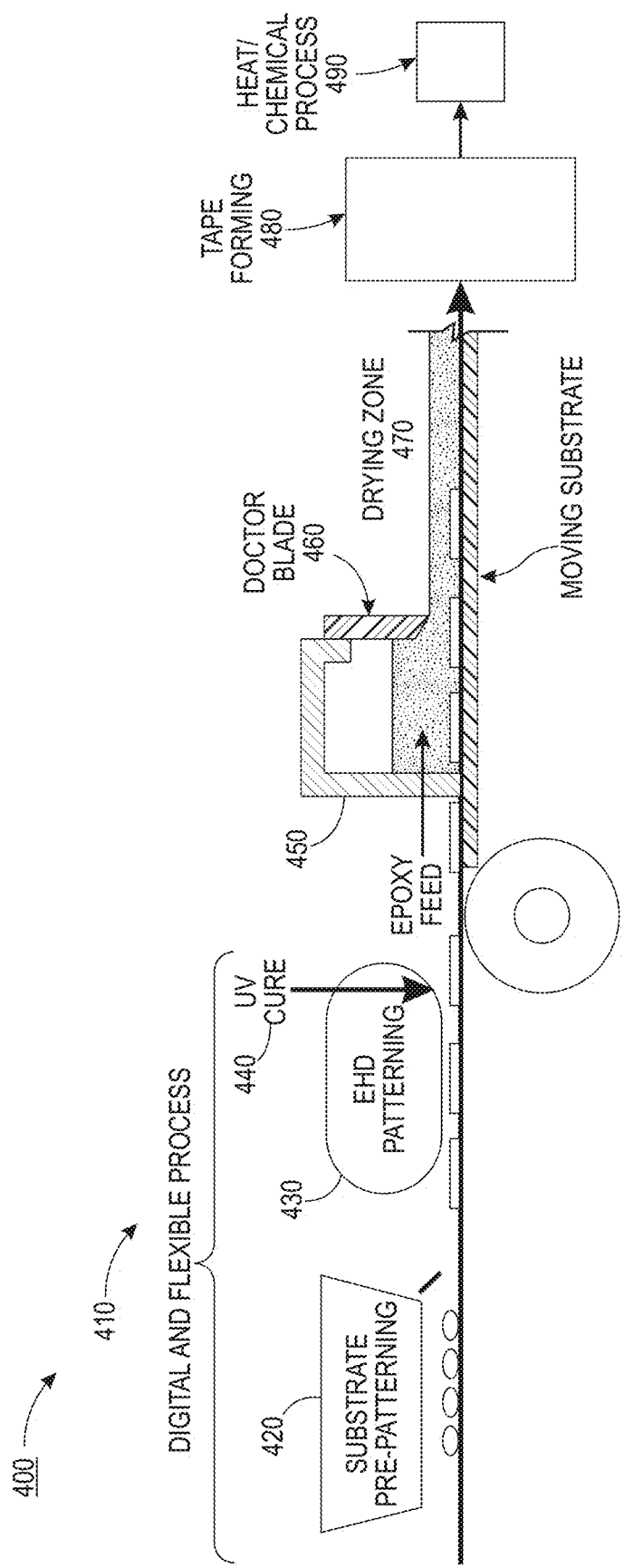
FIG. 10 is an exemplary illustration of a production line to create EHD fugitive patterns.

With reference to FIG. 10, illustrated is a particular production line 400 including equipment to perform the process of FIG. 9, i.e., to produce a vasculature network utilizing an epoxy film line. System 400 provides digital and flexible processing section 410 comprised of substrate pre-patterning system 420 to accomplish process step 310 of FIG. 9 and an EHD-FP 430 and curing 440 system to accomplish process step 320 of FIG. 9. In the substrate pre-patterning process, individual drops of polymer film are disposed onto the surface of a substrate, in some embodiments the substrate is a conductive substrate.

In a particular embodiment, the droplets of the polymer film are pre-patterned with the basic structure for large features of the electrode structure (i.e., the pre-patterned film layer has a geometric pattern or layout which corresponds to the geometric pattern or layout of the electrode configuration of the EHD-FP 430, but which is not provided as at such a high resolution as the electrode configuration).

It should be appreciated that the polymer is applied to the substrate via the pre-patterning system, which can be in the form of an inkjet printer, a roll-to-roll process, a web-based process, or other suitable coating methods and processes known in the art. In other embodiments, other coating devices (e.g., a slot die coating system, a slide coating system, or a curtain coating system) that also reliably create thin films from a few to tens of microns in thickness are used. The EHD-FP system 430 acts on the polymer film on the conductive substrate to create high resolution features.

As previously disclosed, in one embodiment, the polymer film is subjected to an electric field with the electric field strength and liquid thin film characteristics being set such that the liquid thin film undergoes EHD-FP processing thereby forming patterned liquid polymer features. An electrode pattern or a dielectric material to which a charge pattern is applied may be used to pattern the polymer film.

The exemplary EHD-FP patterning system 430 optionally includes a UV, visible light, or heat curing system 440 which cures the electrode generated structures and features.

The exemplary production line 400 also includes an epoxy feed system 450 and post-processing systems including a doctor blade 460 and optional drying zone 470. In the epoxy feed system 450, an epoxy matrix film is cast over the fugitive polymer vasculature master (as in step 330 of FIG. 9). Doctor blade 460 controls the overall height of the epoxy tape, usually much thicker than the EHD-FP polymers. Optional drying zone 470 is used to solidify the surrounding epoxy material, thereby forming solid patterned fugitive structures and features embedded in an epoxy matrix.

Figure 11:
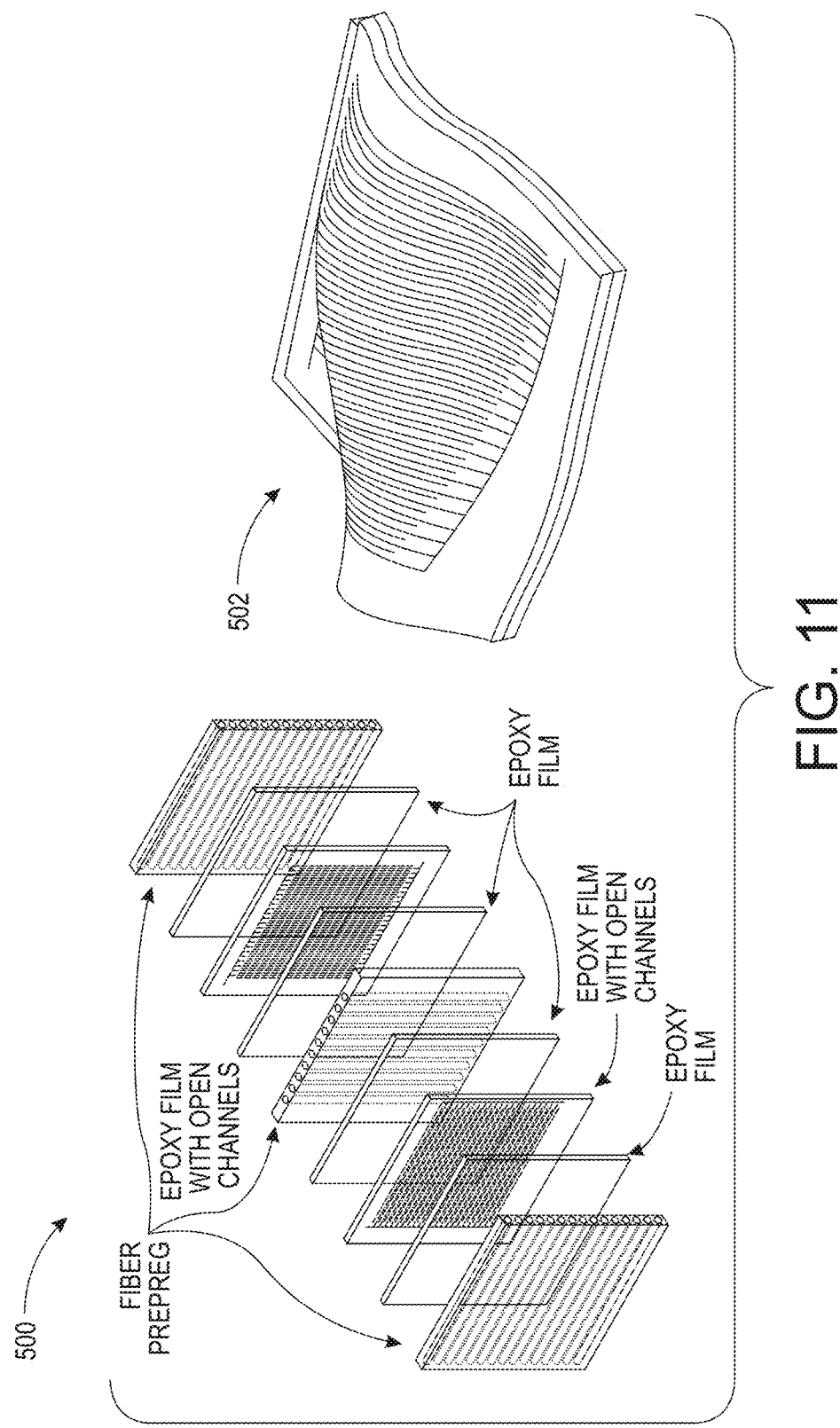
FIG. 11 illustrates a sample lay-up according to the present disclosure.
Figure 12:
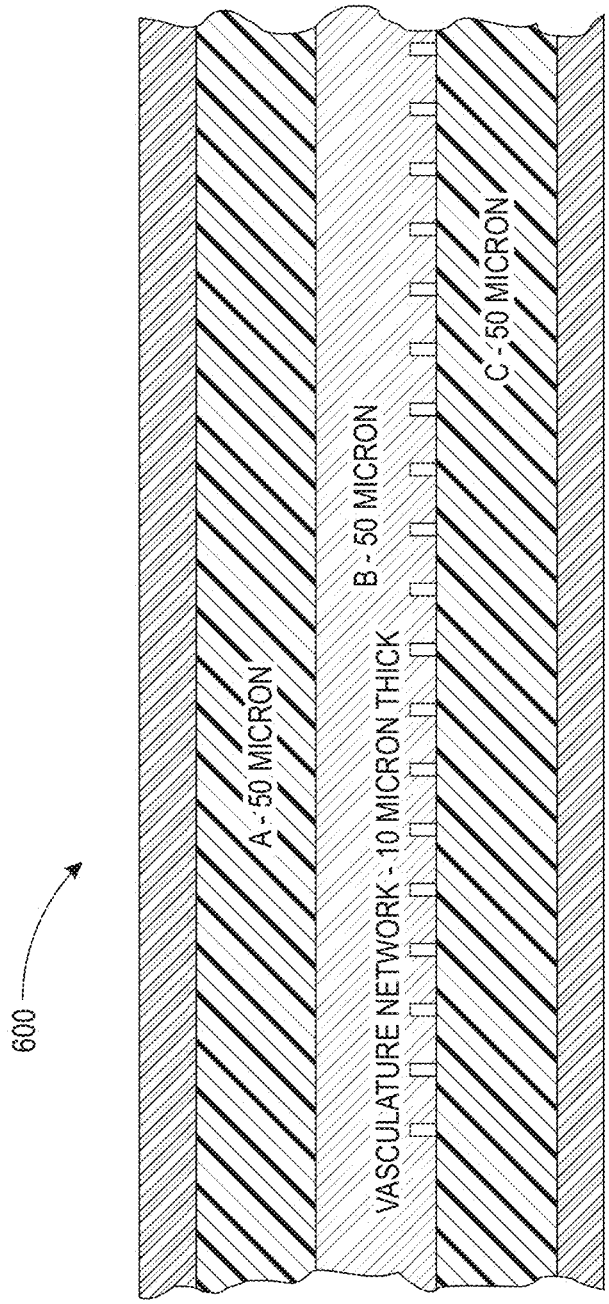
FIG. 12 illustrates an epoxy layer cross-section according to the present disclosure.

It is further shown in FIG. 10 that the output of the production line 400 is optionally provided to an automated tape layer forming system 480, which in an embodiment is configured to automatically form a multi-layered composite structure as for example disclosed in FIGS. 11 and 12.

Still further, shown in FIG. 10 is a heat/chemical fugitive material removal system (e.g., a heater arrangement and/or a chemical applicator) 490, used to remove the fugitive (sacrificial) structure, formed by process 300 of FIG. 9. While this is shown separate from the automated tape layer forming system 480, it may be incorporated therein.

With reference to the exploded view 500 and the non-exploded view 502 of FIG. 11, each epoxy film having vasculature fugitive material is sandwiched between two epoxy layers without vasculature to keep the channels contained and to ensure a good bonding surface between the epoxy and the fiber layers. This sandwiching can be done as part of the initial film fabrication process as to minimize the number of layers needed to be stacked up. Using a 150 micron (or approximately 5.5 mil) nominal total epoxy layer thickness, allows for sufficient compression and flow of the epoxy layer, while preserving the vasculature network within the epoxy layer. Though a 150 micron thickness is a middle ground thickness this manufacturing method can easily be applied to a wide range of total film thickness to adapt to the wide variety of composite layups being used.

Prepared epoxy matrix layers can be placed in between or on the faces of pre-preg carbon fiber layers and the entire assembly can then be cured. The presence of the fugitive polymer EHD-FP created layer will prevent the collapse of the channels under high pressure during the cure process. The flexible nature of the fugitive polymer will allow it to conform to the mold. The fugitive process described here is superior to other methods for creating vasculature networks. For example, casting channels in a film from a master would simply result in voids within the epoxy film that would be filled in by epoxy flow during cure. Adding rigid components like glass tubes prevents the structure from conforming to the mold and is incompatible with the production of 3D composite parts.

After the cure process, the fugitive layer is removed by an additional heating step or chemical process (e.g., accomplished by heat/chemical system 490 of FIG. 10). The method of fugitive layer removal depends on the choice of polymer for the vasculature network and the surrounding resin. A fugitive polymer that is to be removed through a heating step must be solid at the cure temperature of the epoxy resin, but breakdown at a temperature below the service temperature of the epoxy after curing. A fugitive material that is to be removed through a chemical process must also be solid at the cure temperature of the epoxy layer and must be reactive to a solvent that is not reactive to the epoxy.

Figure 13:
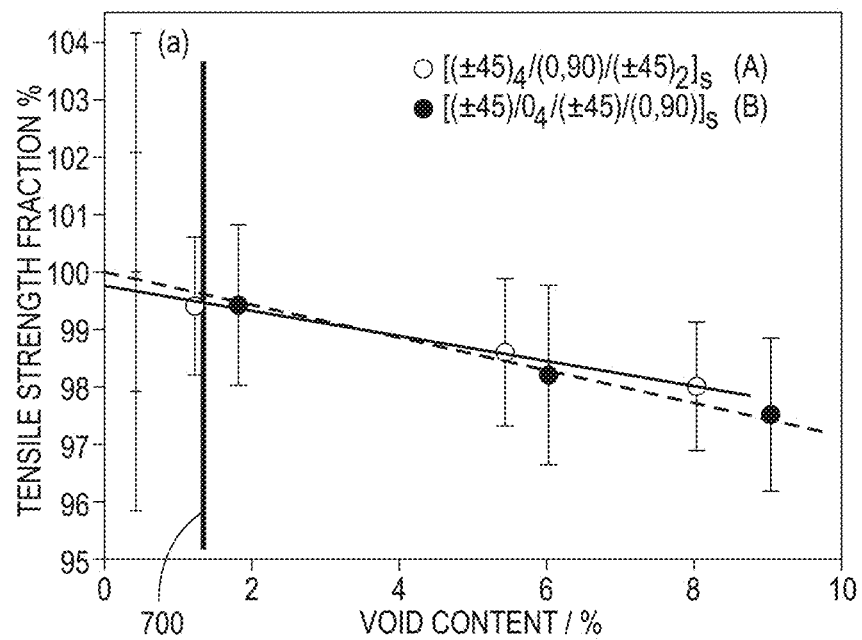
FIG. 13 depicts a tensile strength versus void content chart with expected results of a vasculature produced in accordance with the present teachings.
Figure 14:
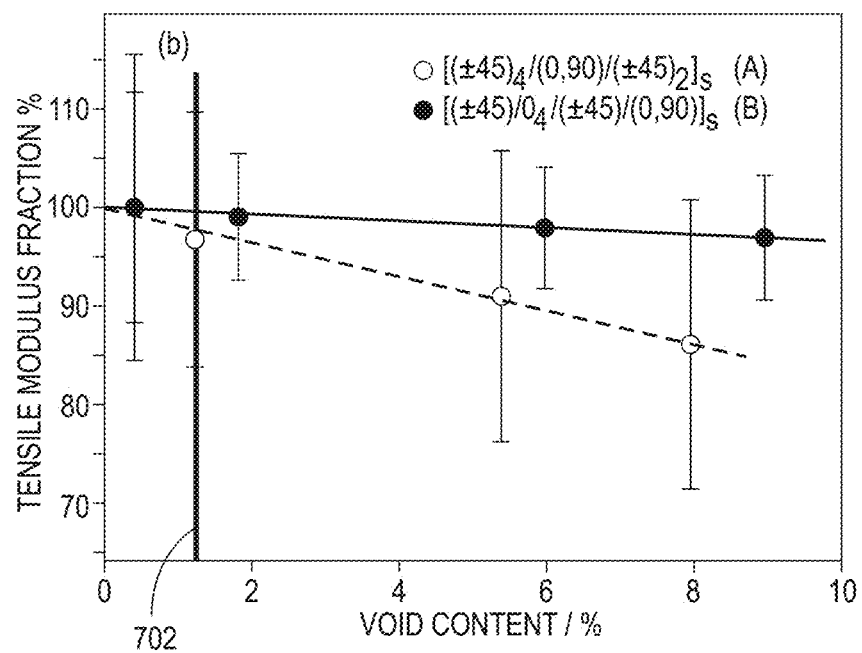
FIG. 14 depicts a tensile modulus versus void content chart, with expected results of a vasculature produced in accordance with the present teachings.

The above-described integral vasculature process creates channels in the existing interface between fiber composite layers, effectively removing mass from the system while maintaining bend integrity. Given that a vasculature working fluid would likely be less dense than the epoxy, there would be no weight gain and possibly even a weight reduction. Without any additional components to act as crack initiators or strength reducers, the primary failure mode for the vasculature-containing composite system will be an epoxy debonding or delamination failure of the epoxy layer. As a proof of concept estimate, consider a system of vasculature channels that are approximately 10 microns high within a 150 micron thick epoxy layer thickness, as shown in the cross-sectional view 700 of FIG. 12. Such a representative optimized vasculature network would occupy roughly 20% of the interfacial area, leading to a total volume fraction void content throughout the entire 150 micron epoxy layer of 1.3%. Based on tensile test data from two sample layups, a very minimal 0.5% reduction in strength and 3% or less reduction in modulus would result as shown in FIGS. 13 and 14 (anticipated vasculature performance is marked with lines 700, 702). The integral vasculature as described here minimizes both the strength and weight tradeoffs in a process that can easily integrate into 3D composites manufacturing.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for creating a structure including a vasculature network, the system comprising:
 a film deposition device configured to dispense droplets onto a surface of a substrate to form a curable fugitive pre-patterned liquid film on the surface of the substrate;
 an electrohydrodynamic film patterning (EHD-FP) device having a patterned electrode structure formed to generate an electric field and subject the curable fugitive pre-patterned liquid film on the surface of the substrate to the electric field, the curable fugitive pre-patterned liquid film being formed by EHD-FP operation into patterned features in response to being subjected to the electric field, wherein the patterned electrode structure of the EHD-FP device includes a dynamic charge generation mechanism that generates a variable charge pattern on the substrate; and
 a casting system configured to cover the patterned features in an epoxy to form patterned structures, wherein the patterned structures comprise a fugitive vasculature network.

2. The system of claim 1, wherein a geometric layout of the curable fugitive pre-patterned liquid film on the substrate corresponds to a geometric layout of the patterned electrode structure.

3. The system of claim 1, further including a curing device configured to solidify the patterned features, wherein the curing device is configured as at least one of an Ultra Violet (UV) curing system, or a visible light curing system, or a thermal curing system.

4. The system of claim 1, wherein the EHD-FP device includes one of a patterned electrode belt or a patterned electrode roller.

5. The system of claim 1, wherein the fugitive vasculature network is included within multiple layers stacked together.

6. The system of claim 1, wherein the film deposition device is a digital inkjet printer configured as a thin film deposition device configured to dispense the droplets on the substrate arranged as a lower conveyor surface to form the curable fugitive pre-patterned liquid film as a thin film, at a point upstream from a gap region wherein the thin film is subsequently conveyed in the gap region by movement of the lower conveyor.

7. The system of claim 1, wherein the fugitive vasculature network is formed in a tape production line.

8. The system of claim 1, further including an automated taping machine, to generate a multi-layer composite structure having the fugitive vasculature network.

9. The system according to claim 1, further including a fugitive material removal system in the form of at least one of a heater or a chemical applicator.

10. The system according to claim 1, wherein the EHD-FP is configured to pattern geometry ranging in size from 10s of microns to millimeters.

11. The system according to claim 1, wherein the EHD-FP provides at least one of patterned electrodes with 5 micron wide electrodes with 200-300 micron spacing and 8.2 micron spacing pillars.

12. The system according to claim 1, further including a first curved conveyor and a second curved conveyor wherein the first curved conveyor and the second curved conveyor curve towards each other.

13. A system for creating a structure including a vasculature network, the system comprising:
 a film deposition device configured to dispense droplets onto a surface of a substrate to form a curable fugitive pre-patterned liquid film on the surface of the substrate;
 an electrohydrodynamic film patterning (EHD-FP) device having a patterned electrode structure formed to generate an electric field and subject the curable fugitive pre-patterned liquid film on the surface of the substrate to the electric field, the curable fugitive pre-patterned liquid film being formed by EHD-FP operation into patterned features in response to being subjected to the electric field, the EHD-FP device including a first curved conveyor and a second curved conveyor, the first curved conveyor and the second curved conveyor curve towards each other wherein a gap area is formed at a nearest location between the first curved conveyor and the second curved conveyor, and drive members drive the first curved conveyor and the second curved conveyor to move through the gap area at a matching speed; and
 a casting system configured to cover the patterned features in an epoxy to form patterned structures, wherein the patterned structures comprise a fugitive vasculature network.

14. The system of claim 13, wherein the patterned electrode structure of the EHD-FP device includes a dynamic charge generation mechanism that generates a variable charge pattern on the substrate.

15. The system of claim 13, wherein the fugitive vasculature network is included within multiple layers stacked together.

16. The system of claim 13, further including an automated taping machine, to generate a multi-layer composite structure having the fugitive vasculature network.

17. The system according to claim 13, further including at least one of a heater or a chemical applicator.

18. A system for creating a structure including a vasculature network, the system comprising:
 at least one of a slot coater or digital ink jet printer configured to dispense material onto a surface of a substrate to form a curable fugitive pre-patterned liquid film on the surface of the substrate;
 an electrohydrodynamic film patterning (EHD-FP) device having a patterned electrode structure formed to generate an electric field and subject the curable fugitive pre-patterned liquid film on the surface of the substrate to the electric field, the curable fugitive pre-patterned liquid film being formed by EHD-FP operation into patterned features in response to being subjected to the electric field, wherein the patterned electrode structure of the EHD-FP device includes a dynamic charge generation mechanism that generates a variable charge pattern on the substrate; and
 an epoxy feeder which covers the patterned features in an epoxy to form patterned structures, wherein the patterned structures comprise a fugitive vasculature network.

19. The system of claim 18, further including a curing device configured to solidify the patterned features, wherein the curing device is configured as at least one of an Ultra Violet (UV) curing system, or a visible light curing system, or a thermal curing system.

20. The system according to claim 18, further including a fugitive material removal system in the form of at least one of a heater or a chemical applicator.

21. The system according to claim 18, further including a first curved conveyor and a second curved conveyor wherein the first curved conveyor and the second curved conveyor curve towards each other.

22. The system of claim 18, wherein the fugitive vasculature network is included within multiple layers stacked together.

23. The system of claim 18, further including an automated taping machine, to generate a multi-layer composite structure having the fugitive vasculature network.

* * * * *